United States Patent
Ryan et al.

(10) Patent No.: US 7,203,021 B1
(45) Date of Patent: Apr. 10, 2007

(54) SELF-HEATING DISK DRIVE

(75) Inventors: Robert P. Ryan, Mission Viejo, CA (US); Dalwinder Singh, Irvine, CA (US)

(73) Assignee: Western Digital Technologies, Inc., Lake Forest, CA (US)

(*) Notice: Subject to any disclaimer, the term of this patent is extended or adjusted under 35 U.S.C. 154(b) by 17 days.

(21) Appl. No.: 11/273,948

(22) Filed: Nov. 15, 2005

(51) Int. Cl.
*G11B 21/02* (2006.01)
*G11B 15/18* (2006.01)

(52) U.S. Cl. .......................... 360/75; 360/71
(58) Field of Classification Search ................... None
See application file for complete search history.

(56) References Cited

U.S. PATENT DOCUMENTS

| | | |
|---|---|---|
| 6,169,930 B1 | 1/2001 | Blachek et al. |
| 6,400,522 B1 * | 6/2002 | Milligan ............... 360/69 |
| 6,731,450 B1 * | 5/2004 | Codilian et al. ............... 360/69 |
| 2005/0068653 A1 | 3/2005 | Escobar et al. |

* cited by examiner

*Primary Examiner*—Hoa T. Nguyen
*Assistant Examiner*—Mitchell Slavitt
(74) *Attorney, Agent, or Firm*—Jason T. Evans, Esq.; Blakely Sokoloff Taylor & Zafman

(57) ABSTRACT

Disclosed is a self-heating disk drive that comprises a voice coil motor (VCM), a spindle motor, and a temperature sensor. The VCM includes a VCM coil and the VCM is configured to move an actuator having a head attached to a distal end of the actuator. The spindle motor includes a plurality of spindle coils to spin a disk of the disk drive. The temperature sensor is used to read an internal temperature of the disk drive. Circuitry is configured to: command the application of current to the VCM coil without loading the head onto the disk and to the spindle coils of the spindle motor in a manner so as not to spin the disk; and, if the internal temperature reading reaches a pre-determined spindle temperature, the spindle motor is allowed to spin-up the disk.

42 Claims, 4 Drawing Sheets

SELF-HEATING DISK DRIVE

BACKGROUND

1. Field of the Invention

The present invention relates to a self-heating disk drive.

2. Description of the Prior Art and Related Information

Today, computing devices such as personal computers, personal digital assistants, cell-phones, etc., are routinely used at work, at home, and everywhere in-between. Computing devices advantageously enable the use of application specific software, file sharing, the creation of electronic documents, and electronic communication and commerce through the Internet and other computer networks. Typically, each computing device has a storage peripheral such as a disk drive.

A huge market exists for disk drives for mass-market computing devices, such as desktop computers and laptop computers, as well as for small form factor (SFF) disk drives for use in mobile computing devices (e.g. personal digital assistants (PDAs), cell-phones, digital cameras, etc.). To be competitive, a disk drive should be relatively inexpensive and provide substantial capacity, rapid access to data, and reliable performance.

Typically, the main assemblies of a disk drive are a head disk assembly (HDA) and a printed circuit board assembly (PCBA). The head disk assembly includes an enclosure including a base and a cover, at least one disk having at least one recording surface, a spindle motor for causing each disk to rotate, and an actuator arrangement. The PCBA generally includes circuitry for processing signals and controlling operations in the disk drive.

An actuator arrangement that is commonly used in hard disk drives is a rotary actuator arrangement included as part of a head stack assembly (HSA) that includes a collection of elements of the head disk assembly. The collection typically includes certain prefabricated subassemblies and certain components that are incorporated into the head disk assembly. For example, a prefabricated head stack assembly (HSA) may include a pivot bearing cartridge, a rotary actuator arrangement, permanent magnets and an arrangement for supporting the magnets to produce a magnetic field for a voice coil motor (VCM).

The rotary actuator arrangement of the HSA may also include a coil, forming another part of the VCM, an actuator body having a bore through it, and a plurality of arms projecting parallel to each other and perpendicular to the axis of the bore. The rotary actuator arrangement of the HSA may also include head gimbal assemblies (HGAs) that are supported by the actuator arms. Each HGA typically includes a load beam and a head supported by the load beam. The head is positioned over a track on a recording surface of the disk to write or read data to or from the track, respectively.

As disk drives are being utilized more and more with mobile devices (e.g. PDAs, cell-phones, etc.), disk drives are increasingly being subjected to very cold operating environments. For example, it is not uncommon for cell-phones and PDAs to be utilized in below freezing environments.

Unfortunately, if a disk drive is powered on while operating in a very cold or freezing environment, damage may occur to components of the disk drive, and/or disk drive performance may be severely compromised. For example, at low temperatures, there is poor lube mobility associated with the spindle motor, and read/write heads typically perform poorly.

There is therefore a need for an effective, efficient means to self-heat a disk drive.

SUMMARY

The present invention relates to a self-heating disk drive.

In one embodiment of the present invention, a self-heating disk drive comprises a voice coil motor (VCM), a spindle motor, and a temperature sensor. The VCM includes a VCM coil, and the VCM is configured to move an actuator having a head attached to a distal end of the actuator. The spindle motor includes a plurality of spindle coils to spin a disk of the disk drive. The temperature sensor is used to read an internal temperature of the disk drive. Circuitry is configured to: command the application of current to the VCM coil without loading the head onto the disk and to the spindle coils of the spindle motor in a manner so as not to spin the disk; and, if the internal temperature reading reaches a pre-determined spindle temperature, the spindle motor is allowed to spin-up the disk.

In another embodiment of the present invention, a method is disclosed to provide a self-heating disk drive. The disk drive includes a voice coil motor (VCM) having a VCM coil, in which the VCM is used to move an actuator having a head attached to a distal end of the actuator, and a spindle motor having a plurality of spindle coils that is used to spin a disk. The method disclosed comprises: applying current to the VCM coil without loading the head onto the disk and to the spindle coils of the spindle motor in a manner so as not to spin the disk; and, if an internal temperature reaches a pre-determined spindle temperature, allowing the spindle motor to spin-up the disk.

In yet another embodiment of the present invention, a disk drive is disclosed that includes a voice coil motor (VCM) having a VCM coil, in which the VCM is configured to move an actuator having a head attached to a distal end of the actuator, and a spindle motor having a plurality of spindle coils that is used to spin a disk. A processor-readable medium is also disclosed, the medium having stored thereon instructions, which, when executed by a processor, cause the processor to perform the following operations comprising: continuously monitoring an internal temperature of the disk drive; applying current to the VCM coil without loading the head onto the disk and to the spindle coils of the spindle motor in a manner so as not to spin the disk; and, if the internal temperature reaches a pre-determined spindle temperature, allowing the spindle motor to spin-up the disk.

In one other embodiment, a method is disclosed to provide a self-heating disk drive in which the disk drive includes a spindle motor having a plurality of spindle coils to spin a disk and a temperature sensor to read an internal temperature of the disk drive. The method disclosed comprises: commanding the application of current to the spindle coils of the spindle motor in a first out-of-phase manner such that the spindle motor generates excess heat in spinning the disk; monitoring the internal temperature; and if the internal temperature reaches a pre-determined temperature, commanding the application of current to the spindle coils of the spindle motor in a more power-efficient manner than the first out-of-phase manner.

The foregoing and other features of the invention are described in detail below and are set forth in the appended claims.

DETAILED DESCRIPTION

In the following description, numerous specific details are set forth. However, it is understood that embodiments of the invention may be practiced without these specific details. In other instances, well-known circuits, structures, and techniques have not been shown in order not to obscure the understanding of this description.

Figure 1:
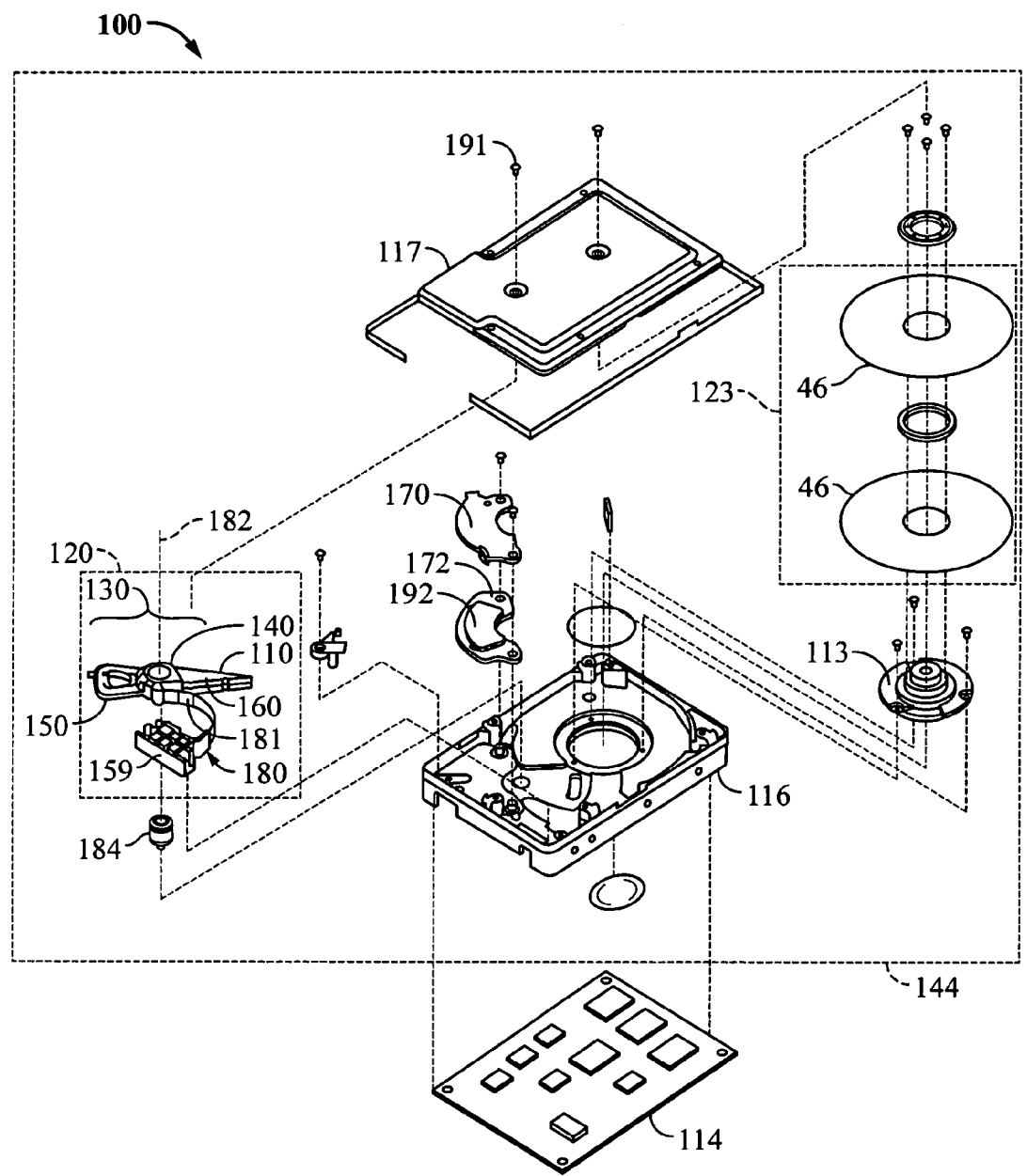
FIG. 1 is a perspective, exploded view illustrating the principal mechanical components of an example of a disk drive that may be utilized with embodiments of the invention.

With reference to FIG. 1, FIG. 1 is a perspective view illustrating the principal mechanical components of an example of a disk drive 100 that may be utilized with embodiments of the invention. The disk drive 100 comprises a head disk assembly (HDA) 144 and a printed circuit board assembly (PCBA) 114. The HDA 144 includes a disk drive enclosure comprising a base 116 and a cover 117 attached to the base 116 that collectively house a disk stack 123 that includes one or a plurality of magnetic disks (e.g. disks 46), a spindle motor 113 attached to the base 116 for rotating the disk stack 123, a head stack assembly (HSA) 120, and a pivot bearing cartridge 184 that rotatably supports the HSA 120 on the base 116. The spindle motor 113 typically rotates the disk stack 123 at a relatively constant angular velocity. In one embodiment, spindle motor 113 may be a three-phase motor having three separate coil windings, as is known in the art.

The HSA 120 comprises a swing-type or rotary actuator assembly 130, at least one head gimbal assembly (HGA) 110, and a flex circuit cable assembly 180. The rotary actuator assembly 130 includes a body portion 140, at least one actuator arm 160 cantilevered from the body portion 140, and a VCM coil 150 cantilevered from the body portion 140 in an opposite direction from the actuator arm 160. The actuator arm 160 supports the HGA 110 that, in turn, supports the head(s). The flex cable assembly 180 may include a flex circuit cable and a flex clamp 159. Further, flex cable assembly 180 may include a temperature sensor 181 mounted to or within the flex circuit cable. Alternatively, a temperature sensor may be mounted on the PCBA 114 facing the HDA 144 surface.

The HSA 120 is pivotally secured to the base 116 via the pivot-bearing cartridge 184 so that the head at the distal end of the HGA 110 may be moved over the surfaces of the disks 46. The pivot-bearing cartridge 184 enables the HSA 120 to pivot about a pivot axis, shown in FIG. 1 at reference numeral 182. The storage capacity of the HDA 144 may be increased by, for example, increasing the track density (the TPI) on the disks 46 and/or by including additional disks 46 in the disk stack 123 and by an HSA 120 having a vertical stack of HGAs 110 supported by multiple actuator arms 160.

The "rotary" or "swing-type" actuator assembly comprises body portion 140 that rotates on the pivot bearing 184 cartridge between limited positions, VCM coil 150 that extends from body portion 140 to interact with one or more permanent magnets 192 mounted to back irons 170, 172 to form the voice coil motor (VCM), and actuator arm 160 that supports HGA 110. The VCM causes the HSA 120 to pivot about the actuator pivot axis 182 to cause the read/write heads or transducers thereof to sweep radially over the disk(s) 46.

Figure 2:
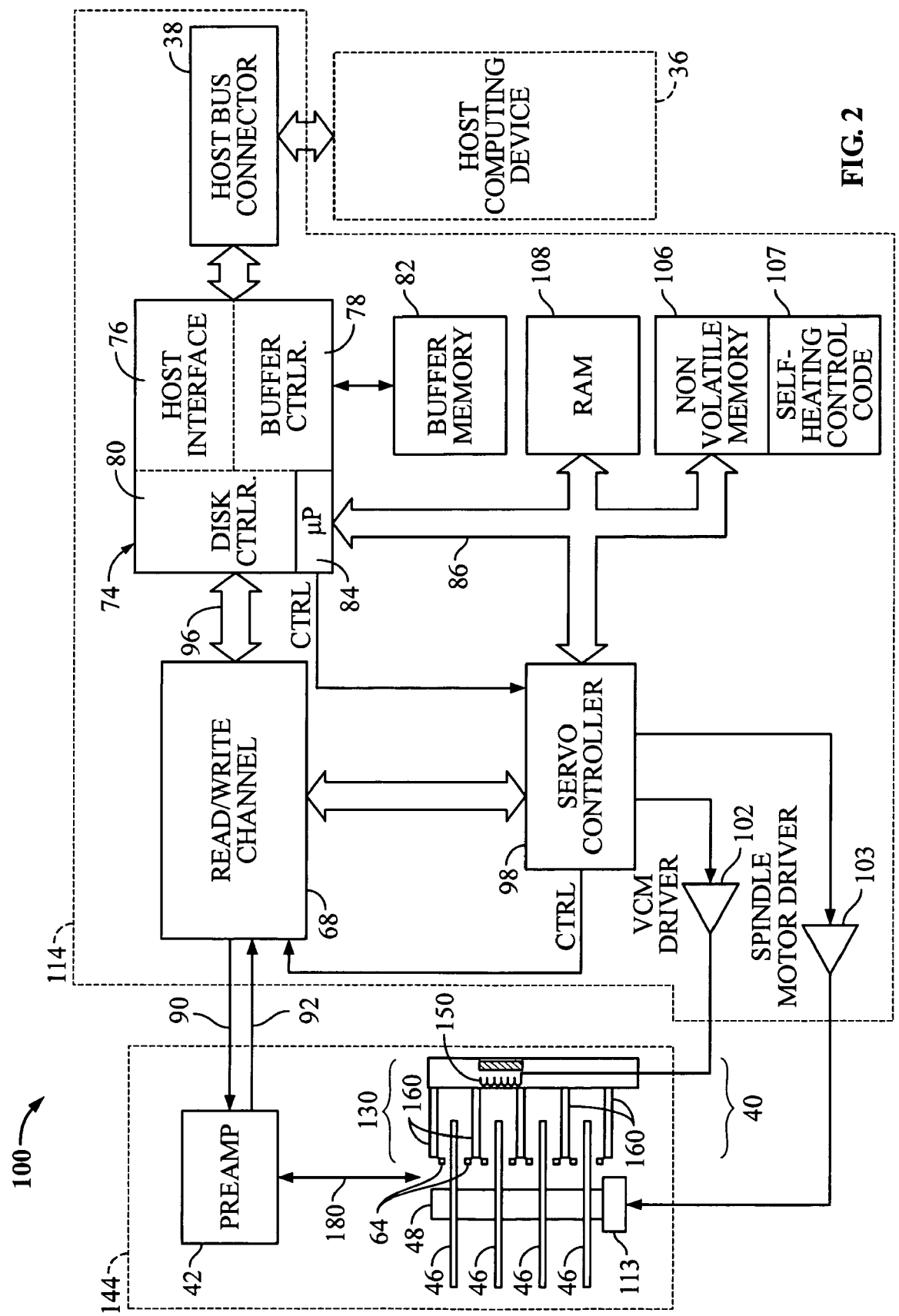
FIG. 2 is a simplified block diagram of the previously-described disk drive of FIG. 1, illustrating particular components of a PCBA and HDA, in which embodiments of the invention may be practiced.

Turning to FIG. 2, FIG. 2 is a simplified block diagram of the previously-described disk drive 100, illustrating particular components of PCBA 114 and HDA 144, in which embodiments of the invention may be practiced. As shown in FIG. 2, disk drive 100 may be connected to a host computing device 36. Computing device 36 may be a desktop computer, a laptop computer, a mobile computing device (e.g., a personal digital assistant (PDA), camera, cell-phone, auto-navigation system, etc.), or any type of computing device utilizing a disk drive. Disk drive 100 comprises head disk assembly (HDA) 144 and PCBA 114.

As previously described, HDA 144 may comprise: one or more disks 46 for data storage (four are shown); a spindle motor 113 for rapidly spinning each disk 46 on a spindle 48; actuator assembly 130, having actuator arms 160 for moving a plurality of heads 64 in unison over each disk 46. The heads 64 are connected to a preamplifier 42 via cable assembly 180 for reading and writing data on the disks 46. Preamplifier 42 is connected to channel circuitry in PCBA 114 via read data line 92 and write data line 90.

In one embodiment, PCBA 114 comprises a read/write channel 68, servo controller 98, host interface disk controller (HIDC) 74, voice coil motor driver 102, spindle motor driver (SMD) 103 to drive a three-phase spindle motor 113, and several memory arrays—buffer or cache memory 82, RAM 108, and non-volatile memory 106.

Host-initiated operations for reading and writing data in disk drive 100 may be executed under control of microprocessor 84 connected to controllers and memory arrays via buses 86 and 96. Program code executed by microprocessor 84 may be stored in non-volatile memory 106 and random access memory RAM 108. Program overlay code may be stored on reserved tracks of disks 46 and may also be loaded into RAM 108 as required for execution.

During disk read and write operations, data transferred by preamplifier 42 may be encoded and decoded by read/write channel 68. During read operations, channel 68 preferably decodes data into digital bits transferred on an NRZ bus 96 to HIDC 74. During write operations, HIDC provides digital data over the NRZ bus to channel 68, which encodes the data prior to its transmittal to preamplifier 42. Preferably, channel 68 employs PRML (partial response maximum likelihood) coding techniques.

HIDC 74 includes a disk controller 80 for formatting and providing error detection and correction of disk data and other disk drive operations, host interface controller 76 for responding to commands from host 36, buffer controller 78 for storing data which is transferred between disks 46 and host 36, and microprocessor 84. The controllers in HIDC 74 may provide automated functions, which assist the microprocessor 84 in controlling disk operations.

A servo controller 98 provides an interface between microprocessor 84 and actuator assembly 130 and spindle motor 113. Microprocessor 84 can command logic in servo controller 98 to position the actuator assembly 130 using a VCM driver 102 and to precisely control the rotation of spindle motor 113 with a spindle motor driver 103.

Disk drive 100 may employ a sampled servo system in which equally spaced servo wedge sectors (termed "servo wedges") are recorded on each track of each disk 46. Data sectors are recorded in the intervals between servo sectors on each track. Servo sectors are sampled at regular intervals to provide servo position information to microprocessor 84. Servo sectors are received by channel 68, and are processed by servo controller 98 to provide position information to microprocessor 84 via bus 86.

In one embodiment, circuitry of the disk drive, such as microprocessor 84, may operate under the control of a program or routine to execute methods or processes in accordance with embodiments of the invention related to providing a self-heating disk drive. For example, such a program may be implemented in software or firmware (e.g., stored in non-volatile memory 106 or other locations) and may be implemented by microprocessor 84 or other circuitry. For example, in one embodiment, non-volatile memory may include self-heating control code 107 to implement aspects of the invention hereinafter discussed.

Components of the various embodiments of the invention may be implemented as hardware, software, firmware, microcode, or any combination thereof. When implemented in software, firmware, or microcode, the elements of the embodiments of the present invention are the program code or code segments that include instructions to perform the necessary tasks. A code segment may represent a procedure, a function, a subprogram, a program, a routine, a subroutine, a module, a software package, a class, or any combination of instructions, data structures, or program statements.

The program or code segments may be stored in a processor-readable medium or transmitted by a data signal embodied in a carrier wave, or a signal modulated by a carrier, over a transmission medium. The "processor-readable or accessible medium" may include any medium that can store, transmit, or transfer information. Examples of accessible media include an electronic circuit, a semiconductor memory device, a read only memory (ROM), a flash memory, an erasable ROM (EROM), a floppy diskette, a compact disk (CD-ROM), an optical disk, a hard disk, a fiber optic medium, a radio frequency (RF) link, etc. The code segments may be downloaded via computer networks such as the Internet, Intranet, etc. The processor-readable or accessible medium may include data that, when accessed by a processor or circuitry, causes the processor or circuitry to perform the operations described herein. The term "data" herein refers to any type of information that is encoded for machine-readable purposes. Therefore, it may include programs, code, data, files, etc.

In one embodiment, a self-heating disk drive is disclosed that may utilize the components of the disk drive 100 discussed with reference to FIGS. 1 and 2. The self-heating disk drive 100 may include a voice coil motor (VCM), a spindle motor 113, and a temperature sensor 181. The VCM may include a VCM coil 150, in which the VCM is configured to move an actuator 130 having heads 64 attached to distal ends of actuator arms 160. The spindle motor 113 may include a plurality of spindle coils configured to spin disks 46. Particularly, in one embodiment, the spindle motor 113 may be a three-phase spindle motor having three coil windings, as are well known in the art.

In one embodiment, temperature sensor 181 may be mounted to the flex circuit cable of the flex circuit cable assembly 180. Alternatively, as is well known, the pre-amplifier 42 may be utilized to estimate an internal temperature of the disk drive based upon breakthrough voltage measurements of the preamplifier. Of course, it should be appreciated that the temperature sensor may be located at various locations within the disk drive to measure an internal temperature of the disk drive dependent upon design considerations. For example, as previously discussed, the temperature sensor may also be located on the PCBA 114 facing the HDA 144.

Self-heating disk drive 100 preferably includes circuitry configured to command the application of current to the VCM coil 150 without loading the heads onto the disks 46 and to the spindle coils of the spindle motor 113 in a manner so as not to spin the disks 46.

For example, current may be applied to the VCM coil 150 in an opposite direction to a typical loading current, such that the actuator assembly 130 and heads 64 are continuously forced towards a parked position against a stop away from the outer diameter of the disks, such that the actuator assembly 130 does not pivot. Alternatively, actuator assembly 130 may be continuously forced towards the landing zones of the inner diameter of the disks 46 adjacent the spindle 48 via current applied to the VCM coil 150. In another embodiment, a latch mechanism may be utilized with the actuator assembly 130. The latch mechanism may latch the actuator assembly 130 in the parked position such that the actuator assembly 130 is not allowed to pivot—in opposition to movement induced by current applied to the VCM coil 150. After self-heating, the latch mechanism may un-latch allowing actuator assembly 130 to pivot such that heads 64 may be loaded onto disks 46, respectively. In effect, VCM coil 150 having current pumped therethrough acts as a heater to heat up the internal components of the disk drive.

Similarly, current is applied to the spindle coils of the spindle motor in a manner so as not to spin the disks 46. For example, in a three-phase spindle motor having three spindle coils, current may be applied to the three spindle coils in a switched-phase manner, thereby causing spindle currents to flow through the spindle coils, while not allowing the spindle motor to spin-up and spin the disks 46. Alternatively, current may only be applied to a single coil or to a pair of coils of the three spindle coils in a manner so as not to spin the disks 46.

In effect, both the VCM coil 150 and the spindle coils of the spindle motor 113 have current pumped therethrough and act as heaters to heat up the internal components of the disk drive.

The self-heating disk drive 100 may further utilize circuitry configured to determine if an internal temperature reading from temperature sensor 181 has reached a pre-determined spindle temperature, and if so, the circuitry is configured to apply current to the spindle coils of the spindle motor 113 in a normal manner, in order to allow the spindle motor 113 to spin-up the disks 46. The circuitry is further configured to continuously monitor the internal temperature reading of the disk drive from the temperature sensor 181.

Also, in one embodiment, the circuitry may be configured to: command the application of current to the spindle coils of the spindle motor 113 in a first out-of-phase manner such that the spindle motor 113 generates excess heat in spinning the disks 46; and, if the internal temperature as monitored by the temperature sensor 181 reaches a pre-determined temperature, command the application of current to the spindle coils of the spindle motor 113 in a more power-efficient manner than the first out-of-phase manner.

For example, applying current to the spindle coils of the spindle motor 113 in a more power-efficient manner than the first out-of-phase manner, may be accomplished by applying current to the spindle coils of the spindle motor 113 in an in-phase manner such that spindle motor 113 does not generate excess heat in spinning the disks 46. Alternatively, the more power-efficient manner may be less out-of-phase, but not completely in-phase, thereby generating less overall heat, but sufficient enough heat to keep the drive warm in a very cold environment. Additionally, the current applied to the spindle coils of the spindle motor 113 in the first out-of-phase manner may be utilized to spin the disk at a higher than normal spin speed to increase air-flow and heat distribution throughout the interior of the disk drive.

It should be understood that the pre-determined spindle temperature obtained from the temperature sensor 181 may be correlated to, but may not match, a temperature of the spindle motor at which the spindle motor can be spun-up. For example, if the temperature sensor 181 is located far from the spindle motor 113, then the temperature reading obtained at the temperature sensor 181 may greatly diverge from the actual temperature of the spindle motor 113. However, in a preferred embodiment, a calibration will be used such that the actual temperature at which the spindle motor 113 should be spun-up is correlated with the pre-determined spindle temperature that can be obtained at the temperature sensor 181 at the same moment. Similar analyses may be used with other predetermined temperature settings used to enable various levels of functionality of the disk drive.

It should be appreciated that, in one embodiment, the circuitry configured to accomplish this functionality may be microprocessor 84. Microprocessor 84 may operate under the control of self-heating control code 107 stored in non-volatile memory 106 to execute the methods or processes in accordance with the embodiments of the present invention related to self-heating. For example, self-heating control code 107 may be implemented in software or firmware stored in non-volatile memory 106 or other locations and may be implemented by microprocessor 84 alone or in conjunction with other circuitry. Therefore, reference will be made hereinafter to microprocessor 84 as being the circuitry that implements this functionality.

However, it should be appreciated that a wide variety of other circuitry may be utilized instead of, or in addition to, microprocessor 84, such as: a state machine, an application specific integrated circuit (ASIC), a central processing unit (CPU), a logic circuit, a controller, a micro-controller, or any type of circuitry capable of processing data.

Once the internal temperature reading of the disk drive reaches a pre-determined VCM temperature, microprocessor 84 may be configured to allow the VCM to load the heads 64 of the actuator assembly 130 onto respective disks 46 by commanding the application of current to the VCM coil 150 in the normal direction for head loading or releasing the latching mechanism. Further, if the internal temperature reading reaches a pre-determined read temperature, microprocessor 84 may be further configured to enable read operations through read/write channel 68.

However, if the pre-determined read temperature is not reached, microprocessor 84 may be configured to allow current to the VCM coil 150 of the VCM to simply enable movement of the actuator arms 160 of the actuator assembly 130 without enabling reading or writing functionality of the read/write heads. For example, full-stroke movement, one-third stroke movement, or one-half stroke movement of the actuator arms 160 across the disks 46 may be enabled. This may increase air-flow movement within the disk drive enclosure and improve heating of the internal components of the disk drive. It has been found that in some drives one-third stroke movements generate the most heat from VCM coil 150.

Alternatively, microprocessor 84 may enable read operations without determining whether the internal temperature reading has reached the pre-determined read temperature. When the internal temperature reading of the disk drive as read by temperature sensor 181 reaches a pre-determined write temperature, microprocessor 84 may further enable write operations through the read/write channel 68.

It should be appreciated that current may be applied to the VCM coil 150 and to the spindle coils of the spindle motor 113 for variable periods of time. These variable time periods are dependent upon the amount of heating required to enable the internal disk drive temperature to reach the pre-determined temperatures associated with the previously-described stages of disk drive functionality, such as: loading the heads onto the disks, performing read operations, performing write operations, etc.

In this way, these various stages of operation can be reached in a power-efficient manner. This is especially important in mobile devices, wherein power is often derived from a battery source, and, therefore, there is a limited amount of power available from the battery. Moreover, since the internal temperature reading is continuously monitored, if an internal disk drive temperature becomes too cold again, for example, during a sleep or idle phase, the previously-described process will automatically enable self-heating.

It is noted that one embodiment of the invention may be described as a process, which is usually depicted as a flow chart, a flow diagram, a structure diagram, or a block diagram. Although a flow chart may describe the operations of the sequential process, many of the operations can be performed in parallel or concurrently. In addition, the order of the operation may be re-arranged. A process may correspond to a method, a function, a procedure, a subroutine, a subprogram, etc. When a process corresponds to a function, its termination corresponds to a return of the function to the calling function or the name function.

Figure 3A:
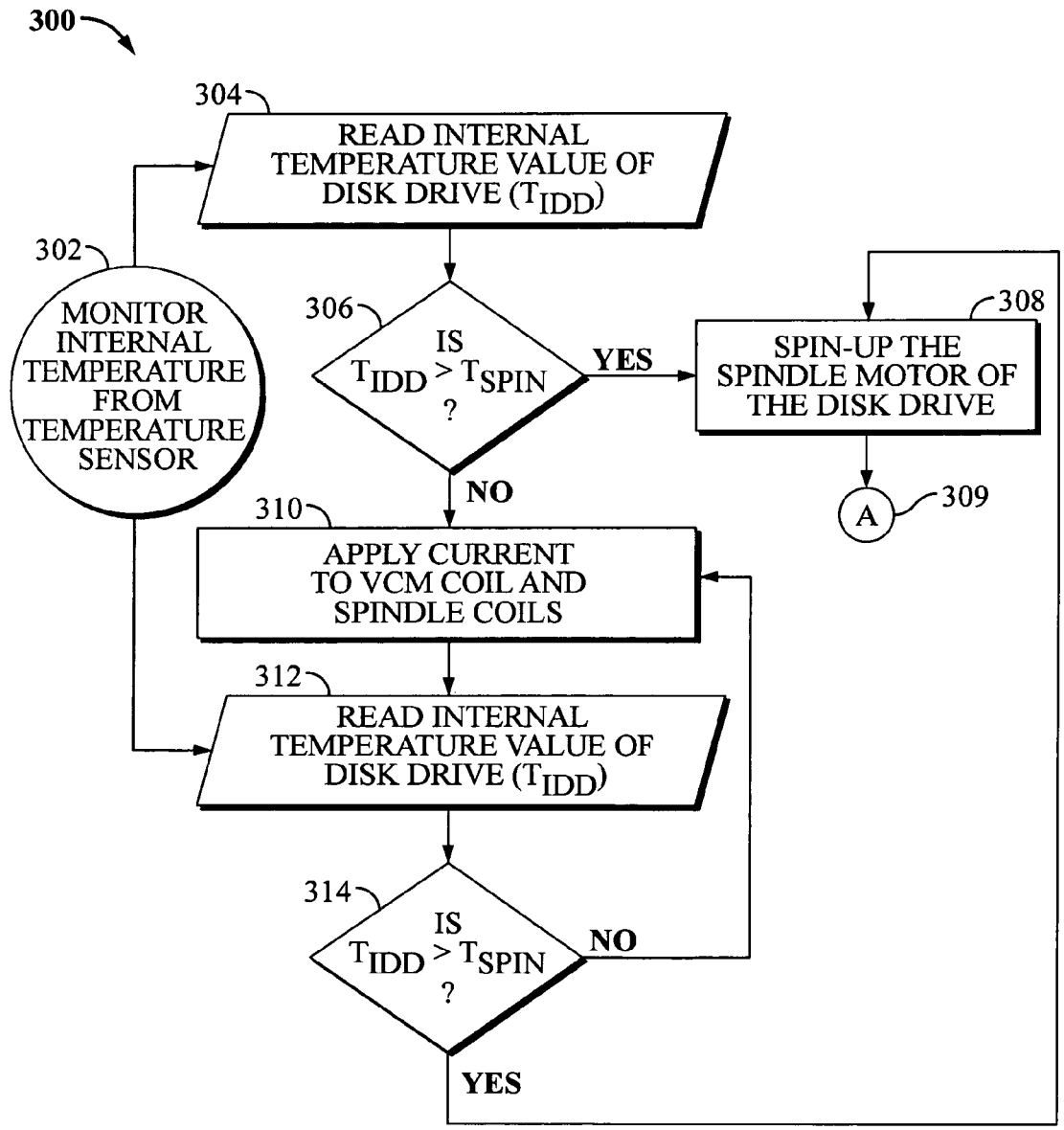
FIG. 3A is a flow diagram illustrating a process for self-heating a disk drive, according to one embodiment of the present invention.
Figure 3B:
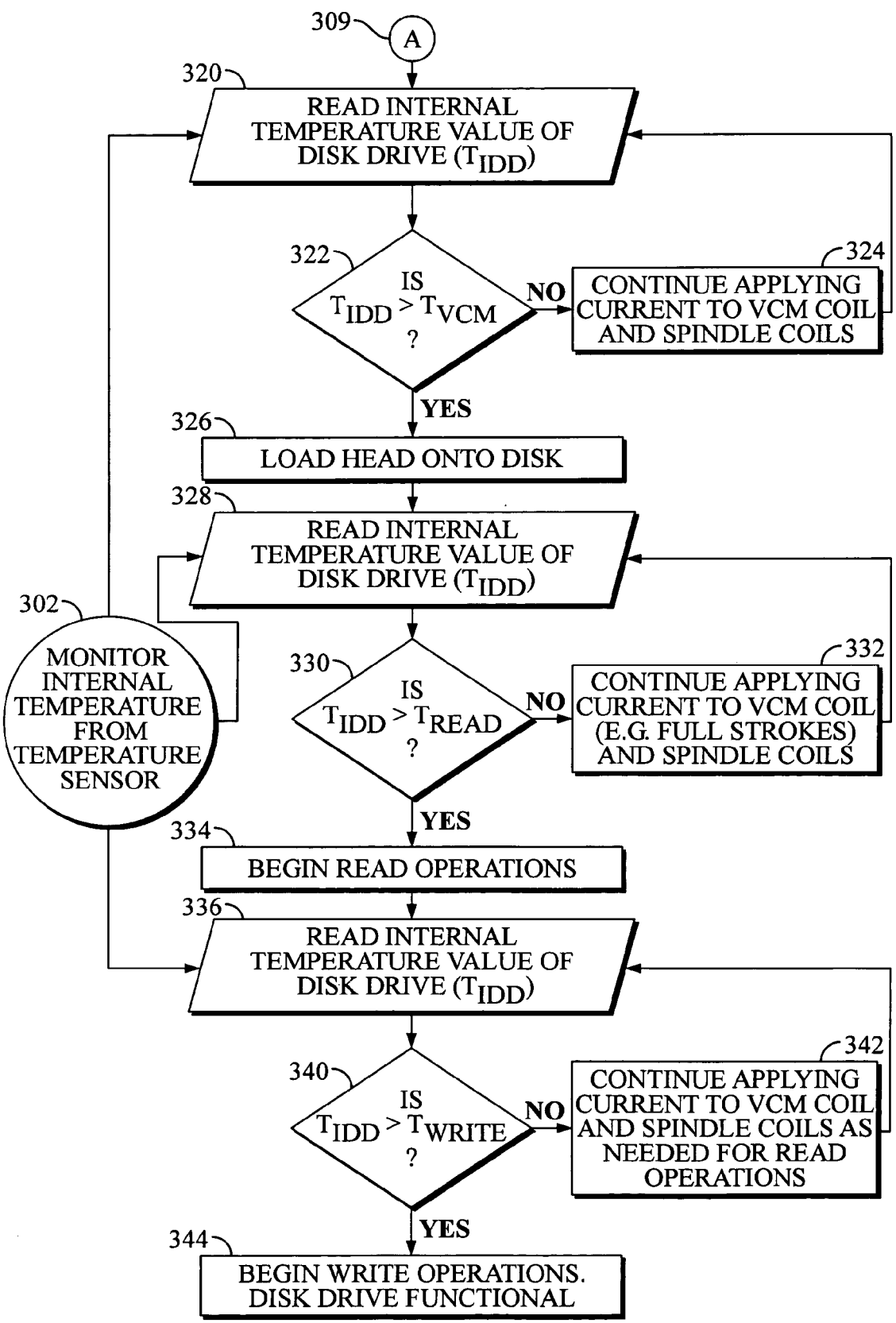
FIG. 3B is a flow diagram further illustrating the process of FIG. 3A for self-heating a disk drive, according to one embodiment of the present invention.

With reference to FIGS. 3A and 3B, flow diagrams are shown, illustrating a process for self-heating a disk drive according to one embodiment of the present invention. As previously described, many of the illustrated functions may be implemented under the control of microprocessor 84 and/or by other types of circuitry.

Referring now to FIG. 3A, a process 300 to self-heat a disk drive is described. It should be noted that an internal temperature of the disk drive is continuously monitored at block 302 utilizing a temperature sensor, such as temperature sensor 181 of the flex circuit cable assembly or a temperature sensor on the PCBA, previously discussed, and the internal temperature reading is continually utilized during the self-heating process 300. As shown in FIGS. 3A and 3B, the internal temperature is continually read at different stages of process 300 (e.g. at process blocks 304, 312, 320, 328 and 336) from monitoring block 302.

To begin with, at block 304, an internal temperature value of the disk drive ($T_{IDD}$) is read. For example, this may occur at power-on or after a sleep or idle phase. Based on the monitored $T_{IDD}$, it is determined at decision block 306 whether $T_{IDD}$ is greater than a pre-determined spindle temperature value ($T_{SPIN}$). $T_{SPIN}$ denotes a pre-determined temperature value, at which it has been determined that it is safe to spin-up the spindle motor. For example, in some disk drives to be utilized with mobile devices, it has been determined that when temperatures are below 5° C. the spindle motor 113 and other disk drive components do not operate properly and, in fact, may be damaged in operation. So, $T_{SPIN}$ may be set to 5° C. or, as discussed above, to a temperature reading indicative of 5° C. at the spindle. If $T_{IDD}$ is above $T_{SPIN}$, then at block 308 the spindle motor 113 may be safely spun-up, and the self-heating disk drive process 300 moves to Circle A 309, as will be discussed later.

However, if the $T_{IDD}$ is less than $T_{SPIN}$, then the self-heating disk drive process 300 moves to block 310. At block 310, current is applied to both the VCM coil 150 and the spindle coils of spindle motor 113. As previously discussed, in one example, current may be applied to the VCM coil 150 in an opposite direction to a loading current for loading the head onto the disk, such that actuator arms 160 and respective heads 64 are forced further towards their parked position against a stop. The actuator arms do not move, and the VCM coil 150 to which electrical current is being applied provides heat to the disk drive. Further, as previously described, in one example, current may be applied to the spindle coils of the spindle motor 113 in a switched-phase manner so as not to spin the disk, and the spindle coils may instead simply provide heat to the disk drive.

At block 312 $T_{IDD}$ is read, and at decision block 314, $T_{IDD}$ is checked again to determine if it is greater than $T_{SPIN}$. If not, disk drive self-heating process 300 returns to block 310, wherein current continues to be applied to the VCM coil and spindle coils, as previously described.

However, if $T_{IDD}$ is greater than $T_{SPIN}$, then at block 308 the spindle motor 113 of the disk drive is spun-up, such that disks 46 begin to rotate and process 300 moves to Circle A 309.

At this point, the internal temperature of the disk drive $(T_{IDD})$ is such that it is at least safe to spin-up the spindle motor 113. This further increases the overall internal temperature of the disk drive because the spinning disks 46 induce air-flow within the disk drive providing for greater heat distribution.

At block 320, the internal temperature value of the disk drive $(T_{IDD})$ is read, and at decision block 322 it is determined whether $T_{IDD}$ is greater than a pre-determined VCM temperature value $(T_{VCM})$. If not, at block 324, current continues to be applied to the VCM coil 150, and the spindle coils of the spindle motor 113 continue to spin the disks.

However, if $T_{IDD}$ is greater than $T_{VCM}$, then heads 46 are loaded onto disks 46 at block 326. The $T_{VCM}$ value is a temperature at which it is judged safe to load the heads onto the disks. For example, this temperature may be slightly above 5° C. dependent upon disk drive characterization. At this point, a normal loading current can be applied to the VCM coil 150 of the VCM in order to load the heads 64 of the actuator assembly 130 onto the disks 46, respectively.

At block 328, again the internal temperature value of the disk drive $(T_{IDD})$ is read. At decision block 330 it is determined whether $T_{IDD}$ is greater than a pre-determined read temperature $(T_{READ})$, which is a predetermined temperature suitable for read operations. For example, a suitable read operation may be slightly less than 10° C. If $T_{IDD}$ is not greater than the $T_{READ}$, then at block 322 current is applied to the VCM coil 150 to enable actuator assembly movement and to the spindle coils of the spindle motor to continue spinning the disks 46, and the internal disk drive heating process 300 moves back to block 328.

Particularly, current may be applied to the VCM coil 150 to enable movement of the actuator arms 160 (as in normal operations) but without reading or writing with the heads 64. More particularly, full-stroke movement, one-half stroke movement, or one-third stroke movement of the actuator arms 160 across the disks 46 may be enabled. By doing this, the VCM coil 150 further generates heat, and the movement of the actuator arms stimulates air-flow internally throughout the disk drive to improve heat distribution and self-heating. It has been found that one-third stroke movement generates the most heat from VCM coil 150, whereas the one-half stroke movements and full stroke movements generate more air-flow within the disk drive.

If $T_{IDD}$ is greater than $T_{READ}$, then read operations can be begun for the disk drive. At block 336, the internal temperature value of the disk drive $(T_{IDD})$ is read. Then, at decision block 340 it is determined whether $T_{IDD}$ is greater than a predetermined write temperature $(T_{WRITE})$. The predetermined write temperature value $T_{WRITE}$ is a temperature that has been determined to be a suitable temperature at which write operations may be performed by the heads 64 with minimal errors. For example, it has been found in some disk drives that at temperatures slightly above 10° C. write operations can be performed with minimal errors.

If $T_{IDD}$ is not greater than $T_{WRITE}$, then current to the VCM coil and spindle motor is applied as needed for read operations, and process 300 moves back to block 336 (block 342). It should be appreciated that during this self-heating process 300, prior to the enablement of the write operation, that microprocessor 84 of the disk drive may command the storing of write data received from the host 36 in disk drive memory (e.g., in buffer memory 82) until a sufficient internal temperature of the disk drive is reached (e.g., $T_{WRITE}$), such that write operations can begin and data from the host can be written to the disks 46.

If $T_{IDD}$ is greater than $T_{WRITE}$, then write operations may be performed, and at this point, the disk drive is fully functional (block 344). Self-heating disk drive process 300 may be continuously run during disk drive operation.

Looking back to process block 308, at which point the spindle motor 113 is spun-up, in one embodiment, current may be applied to the spindle coils of the spindle motor 113 in a first out-of-phase manner such that the spindle motor 113 generates excess heat in spinning-up the disks 46 and thereafter maintaining the disk 46 at a normal spin speed. For example, current may be applied to the spindle coils of the spindle motor 25° out-of-phase.

By doing this, the spindle motor 113 is run in an inefficient manner by utilizing an excessive amount of out-of-phase current applied to the spindle coils to ramp the disks 46 up to a normal spin speed and to maintain the disks at a normal spin speed. This results in the excessive heating of the spindle coils. This additional heating of the spindle coils aids in the self-heating process by raising the internal disk drive temperature $(T_{IDD})$ at a faster rate.

Additionally, the current applied to the spindle coils of the spindle motor 113 in the first out-of-phase manner may also be utilized to spin the disks 46 at higher than normal spin speeds to increase air-flow and heat distribution throughout the interior of the disk drive.

For example, current may be applied to the spindle coils of the spindle motor 113 in an out-of-phase manner at a normal speed (e.g., at 5,400 RPM) such that spindle motor 113 generates excess heat in spinning the disks 46. Also, current may be applied to the spindle coils of the spindle motor 113 in an out-of-phase manner to spin the disks 46, but at higher than normal spin speeds (e.g., at twice the normal speed—10,800 RPM) to increase air-flow and heat distribution throughout the interior of the disk drive. Utilizing higher than normal spin speeds preferably occurs prior to loading the heads 64 onto the disks 46, but in some embodiments, higher than normal spin speeds may be used after head loading.

When the internal temperature as monitored by the temperature sensor 181 reaches a pre-determined temperature, current may be applied to the spindle coils of the spindle motor 113 in a more power-efficient manner than the previously described first out-of-phase manner. For example, applying current to the spindle coils of the spindle motor 113 in a more power-efficient manner than the first out-of-phase manner may be accomplished by applying current to the spindle coils of the spindle motor 113 in an in-phase manner such that spindle motor 113 does not generate excess heat in spinning the disks 46.

However, the more power-efficient manner may also be simply less out-of-phase, but not completely in-phase, thereby generating some additional excess heat in order to maintain sufficient heat generation to keep the drive warm in a very cold environment.

It should be appreciated that the rest of the self-heating process 300 after process block 308 remains the same, as previously described, except that current is being applied to the spindle coils of the spindle motor 113 in an out-of-phase manner such that the spindle motor 113 generates excess heat in spinning the disks 46.

However, at a certain point, as previously discussed, when the internal disk drive temperature reading ($T_{IDD}$) reaches a pre-determined temperature (e.g., a normal spindle operation temperature), the application of current to the spindle coils of the spindle motor 113 may be suitably switched to a more power-efficient manner.

Particularly, in one example, after the internal temperature disk drive temperature reading ($T_{IDD}$) reaches $T_{WRITE}$, such that the disk drive is fully operational, the application of current to the spindle coils may be suitably switched such that current is applied in a more a power-efficient manner than the first out-of-phase manner (e.g. in an in-phase or only slightly out-of-phase manner), such that the spindle motor 113 does not generate as much excess heat in spinning the disks 46, as previously discussed.

In this way, after the disk drive has been self-heated in a rapid fashion by running the spindle motor 113 out-of-phase to generate excess heat, the disk drive may thereafter be run in a more efficient manner to conserve power. This may be important in disk drives utilized in mobile devices that rely on battery power.

As described above, self-heating disk drive process 300 continuously monitors the internal temperature of the disk drive at the various stages of disk drive functionality. Thus, current is applied to the spindle coils of the spindle motor and to the VCM coil for variable periods of time at different stages of the disk drive self-heating process.

By continuously monitoring the internal disk drive temperature, and applying current to the VCM coil and the spindle coils of the spindle motors for variable periods of time to enable successive stages of functionality (e.g., spinning up, loading, reading, and writing), the disk drive self-heats in an efficient and rapid fashion. This is especially important when the disk drive is utilized with mobile devices (e.g. personal digital assistants, cell-phones, cameras, etc.) in which power conservation to maximize battery power is important.

Further, since the various previously-described temperature values for each of the various stages are continuously monitored for, if the disk drive becomes cold again, for example, during a sleep or idle phase, the previously-described process will automatically enable self-heating.

Although only shown at particular points within process 300, the circuitry preferably continuously compares the internal temperature reading with all of the pre-determined temperature values. Thus, if the internal temperature reading falls below a previously surpassed value, the disk drive may return to a more intensive heating process, or may return an error to the user. In one embodiment, the disk drive may indicate to the user that it is too cold to use the drive.

It should be appreciated by those with skill in this art that, although embodiments of the invention have been previously described with reference to particular disk drive components, the embodiments of the invention may be utilized in a wide variety of differing types of storage devices having rotatable media, and that the details disclosed in describing the embodiments of the invention are not intended to limit the scope of the invention as set forth in the appended claims. It should be further understood that various steps shown in FIGS. 3A–3B may be changed or omitted, while performing different embodiments of the invention.

We claim:

1. A self-heating disk drive comprising:
   a voice coil motor (VCM) having a VCM coil, the VCM configured to move an actuator having a head attached to a distal end of the actuator;
   a spindle motor having a plurality of spindle coils to spin a disk;
   a temperature sensor to read an internal temperature of the disk drive; and
   circuitry configured to:
      command the application of current to the VCM coil without loading the head onto the disk and to the spindle coils of the spindle motor in a manner so as to not spin the disk; and
      if the internal temperature reading reaches a pre-determined spindle temperature, allow the spindle motor to spin-up the disk.

2. The disk drive of claim 1, wherein the circuitry is further configured to continuously monitor the internal temperature reading.

3. The disk drive of claim 1, wherein the temperature sensor is mounted to a flex circuit cable connected to the actuator.

4. The disk drive of claim 1, wherein if the internal temperature reading reaches a pre-determined VCM temperature, the circuitry is further configured to allow the VCM coil to load the head of the actuator onto the disk.

5. The disk drive of claim 4, wherein if the internal temperature reading reaches a pre-determined read temperature, the circuitry is further configured to enable read operations.

6. The disk drive of claim 5, wherein if the pre-determined read temperature is not reached, the circuitry is configured to command the application of current to the VCM coil to enable movement of the actuator.

7. The disk drive of claim 6, wherein full stroke movement is enabled.

8. The disk drive of claim 6, wherein one-third stroke movement is enabled.

9. The disk drive of claim 6, wherein one-half stroke movement is enabled.

10. The disk drive of claim 1, wherein if the internal temperature reading reaches a pre-determined write temperature, the circuitry is further configured to enable write operations.

11. The disk drive of claim 1, wherein the application of current to the VCM coil is in an opposite direction to a loading current for loading the head onto the disk and the application of current to the spindle coils is in a switched phase manner so as not to spin the disk.

12. The disk drive of claim 1, wherein the application of current to the VCM coil and to the spindle coils of the spindle motor is for a variable period of time.

13. A method to provide a self-heating disk drive in which the disk drive includes a voice coil motor (VCM) having a VCM coil, the VCM configured to move an actuator having a head attached to a distal end of the actuator, and a spindle motor having a plurality of spindle coils to spin a disk, the method comprising:

applying current to the VCM coil without loading the head onto the disk and to the spindle coils of the spindle motor in a manner so as to not spin the disk; and if an internal temperature reaches a pre-determined spindle temperature, allowing the spindle motor to spin-up the disk.

14. The method of claim 13, the method further comprising continuously monitoring the internal temperature.

15. The method of claim 13, further comprising: if the internal temperature reaches a pre-determined VCM temperature, applying a loading current to the VCM coil to load the head of the actuator onto the disk.

16. The method of claim 15, further comprising: if the internal temperature reaches a pre-determined read temperature, enabling read operations.

17. The method of claim 16, further comprising: if the pre-determined read temperature is not reached, applying current to the VCM coil to enable movement of the actuator.

18. The method of claim 17, wherein full stroke movement is enabled.

19. The method of claim 17, wherein one-third stroke movement is enabled.

20. The method of claim 17, wherein one-half stroke movement is enabled.

21. The method of claim 13, further comprising: if the internal temperature reaches a pre-determined write temperature, enabling write operations.

22. The method of claim 13, wherein the application of current to the VCM coil is in an opposite direction to a loading current for loading the head onto the disk and the application of current to the spindle coils is in a switched phase manner so as not to spin the disk.

23. The method of claim 13, wherein the application of current to the VCM coil and to the spindle coils of the spindle motor is for a variable period of time.

24. In a disk drive including a voice coil motor (VCM) having a VCM coil, the VCM configured to move an actuator having a head attached to a distal end of the actuator, and a spindle motor having a plurality of spindle coils to spin a disk, a processor-readable medium having stored thereon instructions, which, when executed by a processor, cause the processor to perform the following operations comprising:

continuously monitoring an internal temperature of the disk drive;

applying current to the VCM coil without loading the head onto the disk and to the spindle coils of the spindle motor in a manner so as to not spin the disk; and if the internal temperature reaches a pre-determined spindle temperature, allowing the spindle motor to spin-up the disk.

25. The processor-readable medium of claim 24, further comprising instructions to perform the operation of applying a loading current to the VCM coil to load the head of the actuator onto the disk if the internal temperature reaches a pre-determined VCM temperature.

26. The processor-readable medium of claim 25, further comprising instructions to perform the operation of enabling read operations if the internal temperature reaches a pre-determined read temperature.

27. The processor-readable medium of claim 25, further comprising instructions to perform the operation of applying current to the VCM coil to enable movement of the actuator if the pre-determined read temperature is not reached.

28. The processor-readable medium of claim 27, wherein full stroke movement is enabled.

29. The processor-readable medium of claim 27, wherein one-third stroke movement is enabled.

30. The processor-readable medium of claim 27, wherein one-half stroke movement is enabled.

31. The processor-readable medium of claim 24, further comprising instructions to perform the operation of enabling write operations if the internal temperature reaches a pre-determined write temperature.

32. The processor-readable medium of claim 24, further comprising instructions to apply current to the VCM coil in an opposite direction to a loading current for loading the head onto the disk and to apply current to the spindle coils in a switched phase manner so as not to spin the disk.

33. The processor-readable medium of claim 24, wherein the application of current to the VCM coil and to the spindle coils of the spindle motor is for a variable period of time.

34. A method to provide a self-heating disk drive in which the disk drive includes a spindle motor having a plurality of spindle coils to spin a disk and a temperature sensor to read an internal temperature of the disk drive, the method comprising:

commanding the application of current to the spindle coils of the spindle motor in a first out-of-phase manner such that the spindle motor generates excess heat in spinning the disk;

monitoring the internal temperature; and if the internal temperature reaches a pre-determined temperature, commanding the application of current to the spindle coils of the spindle motor in a more power-efficient manner than the first out-of-phase manner.

35. The method of claim 34, wherein commanding the application of current to the spindle coils of the spindle motor in the first out-of-phase manner further comprises applying current to the spindle coils to spin the disk at a higher than normal spin speed.

36. The method of claim 34, wherein commanding the application of current to the spindle coils of the spindle motor in a more power-efficient manner than the first out-of-phase manner further comprises commanding the application of current to the spindle coils of the spindle motor in an in-phase manner such that spindle motor does not generate excess heat in spinning the disk.

37. The method of claim 35, further comprising applying current to a voice coil motor (VCM) coil of a VCM, the VCM configured to move an actuator having a head attached to a distal end of the actuator, wherein the current is applied to the VCM coil without loading the head onto the disk.

38. The method of claim 37, wherein if the internal temperature reaches a pre-determined VCM temperature, further comprising applying a loading current to the VCM coil to load the head of the actuator onto the disk.

39. The method of claim 38, wherein if the internal temperature reaches a pre-determined read temperature, further comprising enabling read operations.

40. The method of claim 38, wherein if a pre-determined read temperature is not reached, further comprising commanding the application of current to the VCM coil to enable movement of the actuator.

41. The method of claim 40, wherein at least one of full stroke, one-third stroke, or one-half stroke movement of the actuator is enabled.

42. The method of claim 38, wherein if the internal temperature reaches a pre-determined write temperature, further comprising enabling write operations.

* * * * *